(12) United States Patent
Hsung

(10) Patent No.: US 11,294,844 B2
(45) Date of Patent: Apr. 5, 2022

(54) ETHERCAT MASTER-SLAVE STATION INTEGRATED BRIDGE CONTROLLER AND CONTROL METHOD THEREOF

(71) Applicant: Ningbo Techmation CO., LTD., Ningbo (CN)

(72) Inventor: Yue-Ling Hsung, New Taipei (TW)

(73) Assignee: Ningbo Techmation CO., LTD., Ningbo (CN)

( * ) Notice: Subject to any disclaimer, the term of this patent is extended or adjusted under 35 U.S.C. 154(b) by 80 days.

(21) Appl. No.: 17/010,065

(22) Filed: Sep. 2, 2020

(65) Prior Publication Data
US 2021/0318978 A1 Oct. 14, 2021

(30) Foreign Application Priority Data
Apr. 14, 2020 (CN) .......................... 202010291113.7

(51) Int. Cl.
G06F 13/40 (2006.01)
(52) U.S. Cl.
CPC .................. *G06F 13/4031* (2013.01)
(58) Field of Classification Search
CPC ............. G06F 13/4031; G05B 19/418; G05B 19/4186
See application file for complete search history.

(56) References Cited

U.S. PATENT DOCUMENTS

| | | | |
|---|---|---|---|
| 7,979,745 B2* | 7/2011 | Moroda | G06F 11/321 714/28 |
| 2013/0238700 A1* | 9/2013 | Papakipos | H04L 67/18 709/204 |
| 2015/0117446 A1* | 4/2015 | Edmiston | H04L 49/251 370/389 |
| 2017/0091130 A1* | 3/2017 | Matsunaga | G06F 13/4282 |
| 2019/0372746 A1* | 12/2019 | Tamura | H04L 7/0004 |
| 2020/0092133 A1* | 3/2020 | Quakernack | H04L 12/40032 |
| 2020/0218215 A1* | 7/2020 | Quakernack | G05B 19/4185 |

FOREIGN PATENT DOCUMENTS

| CN | 105589447 A | * | 5/2016 |
|---|---|---|---|
| CN | 105589447 A | | 5/2016 |
| CN | 110177013 A | | 8/2019 |

* cited by examiner

*Primary Examiner* — Phong H Dang
(74) *Attorney, Agent, or Firm* — Kelly & Kelley, LLP

(57) ABSTRACT

An EtherCAT master-slave station integrated bridge controller, a control method, a control system and a readable storage medium are provided. Therein, an FPGA-based EtherCAT master-slave station integrated bridge controller is constructed. Because of the hardware parallel computing capability of FPGA, the master station of the EtherCAT master-slave station integrated bridge controller has a hard real-time characteristic so as to ensure real-time sending and receiving of EtherCAT network data and reduce the dependence on CPU performance and operating system real-time performance. The EtherCAT master-slave station integrated bridge controller can serve as a slave device relative to a third-party master station device and meanwhile serve as a master device relative to a third-party slave station device, thus reducing the load of EtherCAT bus network and improving the flexibility of network topology.

10 Claims, 4 Drawing Sheets though the GPMC bus and sending the first data to the third-party slave station device; the master station portion receiving second data from the third-party slave station device and feeding the second data back to the external CPU; the slave station portion accessing third data in the external CPU through the GPMC bus and sending the third data to a third-party master station device; and the slave station portion receiving fourth data from the third-party master station device and feeding the fourth data back to the external CPU.
ETHERCAT MASTER-SLAVE STATION INTEGRATED BRIDGE CONTROLLER AND CONTROL METHOD THEREOF

CROSS-REFERENCE TO RELATED APPLICATIONS

This application claims priority to Chinese Patent Application Serial No. 202010291113.7, filed on Apr. 14, 2020. The entirety of the above-mentioned patent application is hereby incorporated by reference herein and made a part of this specification.

BACKGROUND

1. Technical Field

The present disclosure relates to communication technologies, and more particularly, to an EtherCAT master-slave station integrated bridge controller, a control method, a control system and a readable storage medium.

2. Description of Related Art

EtherCAT (Ethernet for Control Automation Technology) is an open architecture field bus system based on Ethernet. EtherCAT has been widely used in industries due to its characteristics of high real-time performance, flexible topology and simple system configuration.

Current EtherCAT uses a master-slave media access control mode. A master station uses a standard Ethernet card, and a slave station uses a special ESC (EtherCAT Slave Controller) chip such as E1100, ET1200 or LAN9252 to achieve the slave station function. Linear topology communication is applied between master and slave station devices. For example, a master station device sends a telegram, and a slave station device reads data addressed to it from the master station when the telegram passes through the node of the slave station device, and inserts data (to be sent back to the master station) into the telegram. In the process, the telegram is only delayed by tens of nanoseconds. After the telegram has passed through all slave stations and data exchanges have been completed, the telegram is sent back by the last slave station of the EtherCAT segment.

An EtherCAT master station device is the core of an entire EtherCAT master-slave system. The EtherCAT master station device must be able to operate stably and reliably so as to ensure real-time and synchronization of slave station devices. The EtherCAT master station device is implemented through an embedded solution from Beckhoff in Germany based on a Windows, Linux or Android operating system of personal computers. Since the Windows, Linux or Android operating system is not a real-time operating system, task scheduling priority of an EtherCAT protocol analysis process is uncontrollable and uncertain, thus prolonging the time for the master and slave stations to receive data, increasing the communication period and period jitter and hence failing to meet the requirement of CNC (computer numerical control) high-precision synchronization control. To ensure the real-time performance of the master station, some devices use an RTOS real-time operating system such as a Vxworks, QNX, uC/OS II operating system. However, since the copyright of the RTOS operating system is expensive and software transplantation needs heavy workload, it is difficult to be widely used. Further, a current EtherCAT bus control system usually includes only one EtherCAT master station device and a plurality of EtherCAT slave station devices. Single-master network topology communication relies on allocation and scheduling of one master station. Once the master station device or any slave station device fails, the entire network may be paralyzed.

Therefore, how to overcome the above-described drawbacks has become critical.

SUMMARY

In view of the above-described drawbacks, the present disclosure provides an EtherCAT master-slave station integrated bridge controller, a control method, a control system and a readable storage medium so as to improve the reliability of field bus control.

The control method is applicable in an FPGA-based EtherCAT master-slave station integrated bridge controller comprising a master station portion, a slave station portion and a GPMC (general purpose memory controller) bus. The control method comprises the steps of: the master station portion accessing first data in an external CPU (central processing unit) through the GPMC bus and sending the first data to a third-party slave station device; the master station portion receiving second data from the third-party slave station device and feeding the second data back to the external CPU; the slave station portion accessing third data in the external CPU through the GPMC bus and sending the third data to a third-party master station device; and the slave station portion receiving fourth data from the third-party master station device and feeding the fourth data back to the external CPU.

In an embodiment, the master station portion comprises a master station sending buffer and a master station clock, and the step of accessing the first data in the external CPU through the GPMC bus and sending the first data to the third-party slave station device comprises: accessing the first data, storing the first data into the master station sending buffer, and sending the first data to the third-party slave station device at a certain time according to the master station clock.

In an embodiment, the master station portion comprises a master station receiving buffer, and the step of receiving the second data from the third-party slave station device and feeding the second data back to the external CPU comprises: receiving the second data, and storing the second data into the master station receiving buffer so as for the external CPU to access the second data.

In an embodiment, the slave station portion comprises a slave station sending buffer and a slave station processing module, and the step of accessing the third data in the external CPU through the GPMC bus and sending the third data to the third-party master station device comprises: accessing the third data, storing the third data into the slave station sending buffer, and inserting the third data into a data packet by the slave station processing module so as to send the third data to the third-party master station device.

In an embodiment, the slave station portion comprises a slave station receiving buffer, and the step of receiving the fourth data from the third-party master station device and feeding the fourth data back to the external CPU comprises: receiving the fourth data, and storing the fourth data into the slave station receiving buffer so as for the external CPU to access the fourth data.

The EtherCAT master-slave station integrated bridge controller is built in an FPGA (field-programmable gate array) and comprises a master station portion, a slave station portion and a GPMC bus, wherein the master station portion is connected to an external CPU through the GPMC bus, the slave station portion is connected to the external CPU through the GPMC bus, the master station portion is connected to a third-party slave station device through a network driver chip, and the slave station portion is connected to a third-party master station device through a network driver chip.

In an embodiment, the master station portion comprises: a master station processing module, a master station clock, a master station sending buffer, a master station receiving buffer, and a master station status register.

In an embodiment, the slave station portion comprises: a slave station processing module, a slave station clock, a slave station sending buffer, a slave station receiving buffer, and a slave station status register.

In an embodiment, the GPMC bus comprises a decoder, a unidirectional address bus, a bidirectional data bus, a GPMC bus control signal, and an interrupt arbitration controller, wherein the GPMC bus control signal comprises a chip selection signal, a write signal and a read signal that are low level effective.

The control system is based on a master-slave station integrated bridge controller and comprises: at least one bridge controller as described above, a third-party master station device, one or more third-party slave station devices, and an external CPU for controlling the bridge controller, wherein the third-party master station device is connected to the slave station portion of the bridge controller, the third-party slave station devices is communicatively connected to the master station portion of the bridge controller, and the external CPU is communicatively connected to the master station portion or the slave station portion through the GPMC bus.

The readable storage medium has a computer program stored thereon. When the computer program is executed by a processor, it implements the steps of the control method of the EtherCAT master-slave station integrated bridge controller as described above.

The control method of the EtherCAT master-slave station integrated bridge controller of the present disclosure is applied in the FPGA-based bridge controller comprising a master station portion, a slave station portion and a GPMC bus. The control method comprises the steps of: accessing, by the master station portion, first data in an external CPU through the GPMC bus and sending the first data to a third-party slave station device; receiving, by the master station portion, second data from the third-party slave station device and feeding the second data back to the external CPU; accessing, the slave station portion, third data in the external CPU through the GPMC bus and sending the third data to a third-party master station device; and receiving, by the slave station portion, fourth data from the third-party master station device and feeding the fourth data back to the external CPU.

In the present method, because of the parallel characteristic of FPGA, the FPGA-based bridge controller has a hard real-time characteristic and a parallel capability. As such, during control of an industrial bus, the present method ensures real-time sending and receiving of data and reduces the dependence on the CPU and operating system. Furthermore, the bridge controller can serve as a slave device relative to a third-party master station device and meanwhile serve as a master device relative to a third-party slave station device. That is, the bridge controller can communicate the third-party master station device and the third-party slave station device and serve as both a master station and a slave station. By connecting two or more bridge controllers in series, the connection topology interface between the third-party master station device and the third-party slave station device can be changed. The current single linear communication can use the bridge controllers as connection nodes to construct a network topology having a tree structure, thereby improving the flexibility of the network topology, reducing the network load, and improving the reliability and real-time performance of the network system.

Accordingly, the EtherCAT master-slave station integrated bridge controller, the control system and the readable storage medium also achieve the above-described technical effects, and detailed description thereof is omitted herein.

DETAILED DESCRIPTION

The following illustrative embodiments are provided to illustrate the present disclosure, these and other advantages and effects can be apparent to those in the art after reading this specification.

It should be noted that all the drawings are not intended to limit the present disclosure. Various modifications and variations can be made without departing from the spirit of the present disclosure. Further, terms such as "first," "second," "on," "a," etc., are merely for illustrative purposes and should not be construed to limit the scope of the present disclosure.

First Embodiment

Figure 1:
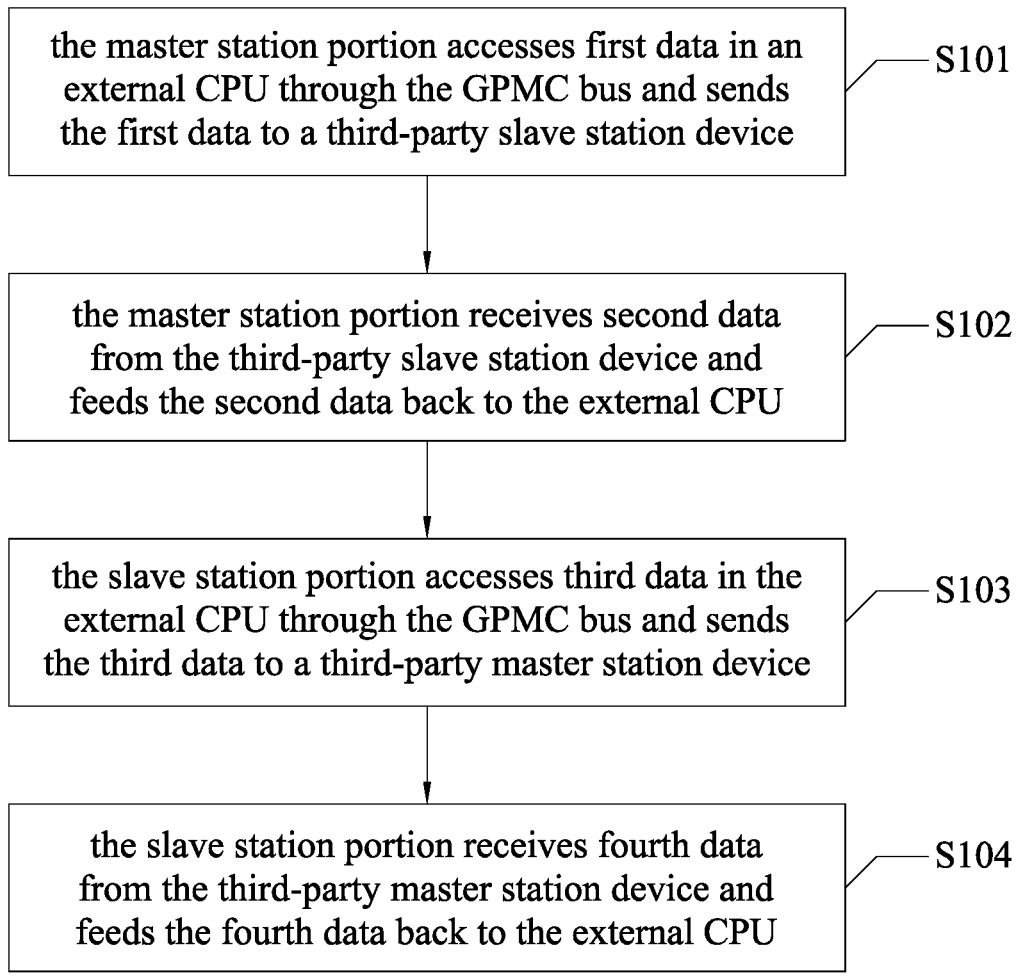
FIG. 1 is a flowchart showing a control method of an EtherCAT master-slave station integrated bridge controller according to an embodiment of the present disclosure.
Figure 2:
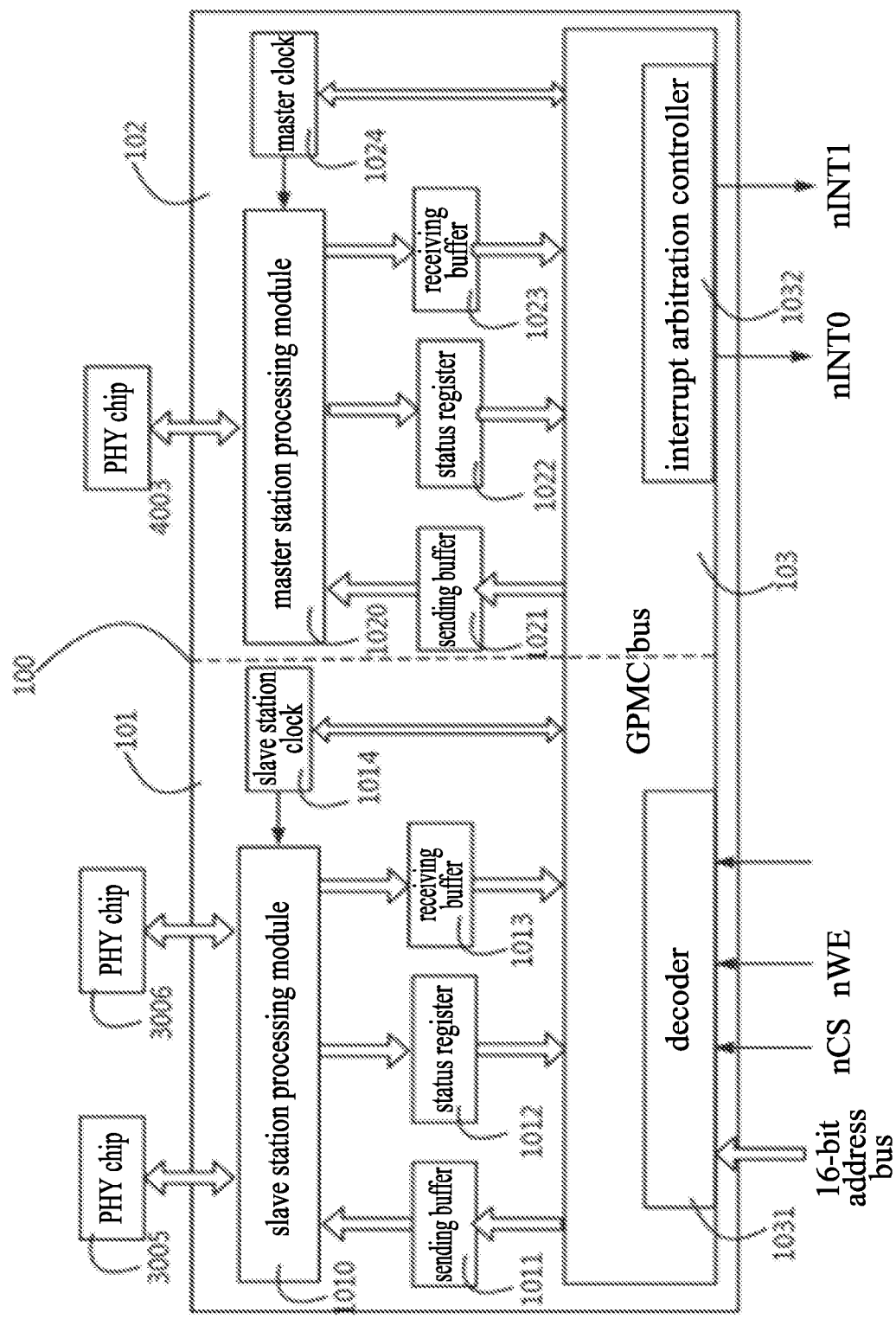
FIG. 2 is a schematic diagram showing a structure of a bridge controller according to an embodiment of the present disclosure.

FIG. 1 is a flowchart showing a control method of an EtherCAT master-slave station integrated bridge controller according to an embodiment of the present disclosure. For example, the control method of the EtherCAT master-slave station integrated bridge controller is applicable in an FPGA-based bridge controller. Referring to FIG. 2, the bridge controller has a master station portion, a slave station portion and a GPMC bus.

The control method includes the following steps.

At S101, the master station portion accesses first data in an external CPU through the GPMC bus and sends the first data to a third-party slave station device.

Therein, the master station portion is relative to the third-party slave station device, and the bridge controller plays the role of a master station. That is, the master station portion can be considered as a virtual master station in the FPGA-based bridge controller, and the master station portion has the processing power/function of a master station device. Specifically, the third-party slave station device can be other bridge controller or an EtherCAT slave station device.

Specifically, the first data can be control data used by the external CPU for controlling the third-party slave station device.

When the master station portion includes a master station sending buffer and a master station clock, the processing of the first data can specifically include: accessing the first data, storing the first data into the master station sending buffer, and sending the first data to the third-party slave station device at a certain time according to the master station clock. That is, the bridge controller can access the first data in the external CPU through the GPMC bus, store the first data into the master station sending buffer, and send the first data to the third-party slave station device at a certain time under control of the master station clock.

At S102, the master station portion receives second data from the third-party slave station device and feeds the second data back to the external CPU.

Specifically, the second data can be data of the third-party slave station device in response to control management of the external CPU or event data that is generated by the third-party slave station device in operation and needs to be reported to the external CPU for processing.

When the master station portion includes a master station receiving buffer, the processing of the second data by the master station portion can specifically include: receiving the second data, and storing the second data into the master station receiving buffer so as for the external CPU to access the second data. That is, after the master station portion in the bridge controller receives the second data, it can store the second data into the master station receiving buffer. As such, the external CPU can access the second data by reading the master station receiving buffer.

At S103, the slave station portion accesses third data in the external CPU through the GPMC bus and sends the third data to a third-party master station device.

Therein, the slave station portion is a portion of the FPGA-based bridge controller that implements the function of a slave station. Specifically, the third-party master station device can be other bridge controller or an EtherCAT master station device. Specifically, the third data can be data used by the external CPU for controlling the third-party master station device.

When the slave station portion includes a slave station sending buffer and a slave station processing module, the processing of the third data by the slave station portion can include accessing the third data, storing the third data into the slave station sending buffer, and inserting the third data into a data packet by the slave station processing module so as to send the third data to the third-party master station device. That is, when the slave station portion accesses the third data in the external CPU, it can store the third data into the slave station sending buffer and then insert the third data into a data packet through the slave station processing module so as to send the third data to the third-party master station device.

At S104, the slave station portion receives fourth data from the third-party master station device and feeds the fourth data back to the external CPU.

Specifically, the fourth data can be data that needs to be sent from the third-party master station device to the external CPU, for example, response data.

When the slave station portion includes a slave station receiving buffer, the processing of the fourth data by the slave station portion includes: receiving the fourth data, and storing the fourth data into the slave station receiving buffer so as for the external CPU to access the fourth data. When the slave station portion in the bridge controller receives the fourth data from the third-party master station device, it can store the fourth data into the slave station receiving buffer so as for the external CPU to read the fourth data from the slave station receiving buffer.

The aforementioned steps describe the specific contents of the master station portion and the slave station portion in the bridge controller. In practical applications, the modules of the master station device and slave station portion can further include specific functional modules such as clocks and status registers. Furthermore, steps S101, S102, S103 and S104 can be performed in parallel or in sequence according to specific data transmission requirements.

The control method of the EtherCAT master-slave station integrated bridge controller of the present disclosure is applied in an FPGA-based bridge controller. The bridge controller includes a master station portion, a slave station portion and a GPMC bus. The control method of the EtherCAT master-slave integrated bridge controller includes the steps of: the master station portion accessing first data in an external CPU through the GPMC bus and sending the first data to a third-party slave station device; the master station portion receiving second data from the third-party slave station device and feeding the second data back to the external CPU; the slave station portion accessing third data in the external CPU through the GPMC bus and sending the third data to a third-party master station device; and the slave station portion receiving fourth data from the third-party master station device and feeding the fourth data back to the external CPU.

In the present method, because of the parallel characteristic of FPGA, the FPGA-based bridge controller has a hard real-time characteristic and a parallel capability. As such, during control of an industrial bus, the present method ensures real-time sending and receiving of data and reduces the dependence on the CPU and operating system. Furthermore, the bridge controller can serve as a slave device relative to a third-party master station device and meanwhile serve as a master device relative to a third-party slave station device. That is, the bridge controller can communicate the third-party master station device and the third-party slave station device and serve as both a master station and a slave station. By connecting two or more bridge controllers in series, the connection topology interface between the third-party master station device and the third-party slave station device can be changed. The current single linear communication can use the bridge controllers as connection nodes to construct a network topology having a tree structure, thereby improving the flexibility of the network topology, reducing the network load, and improving the reliability and real-time performance of the network system.

Second Embodiment

Figure 3:
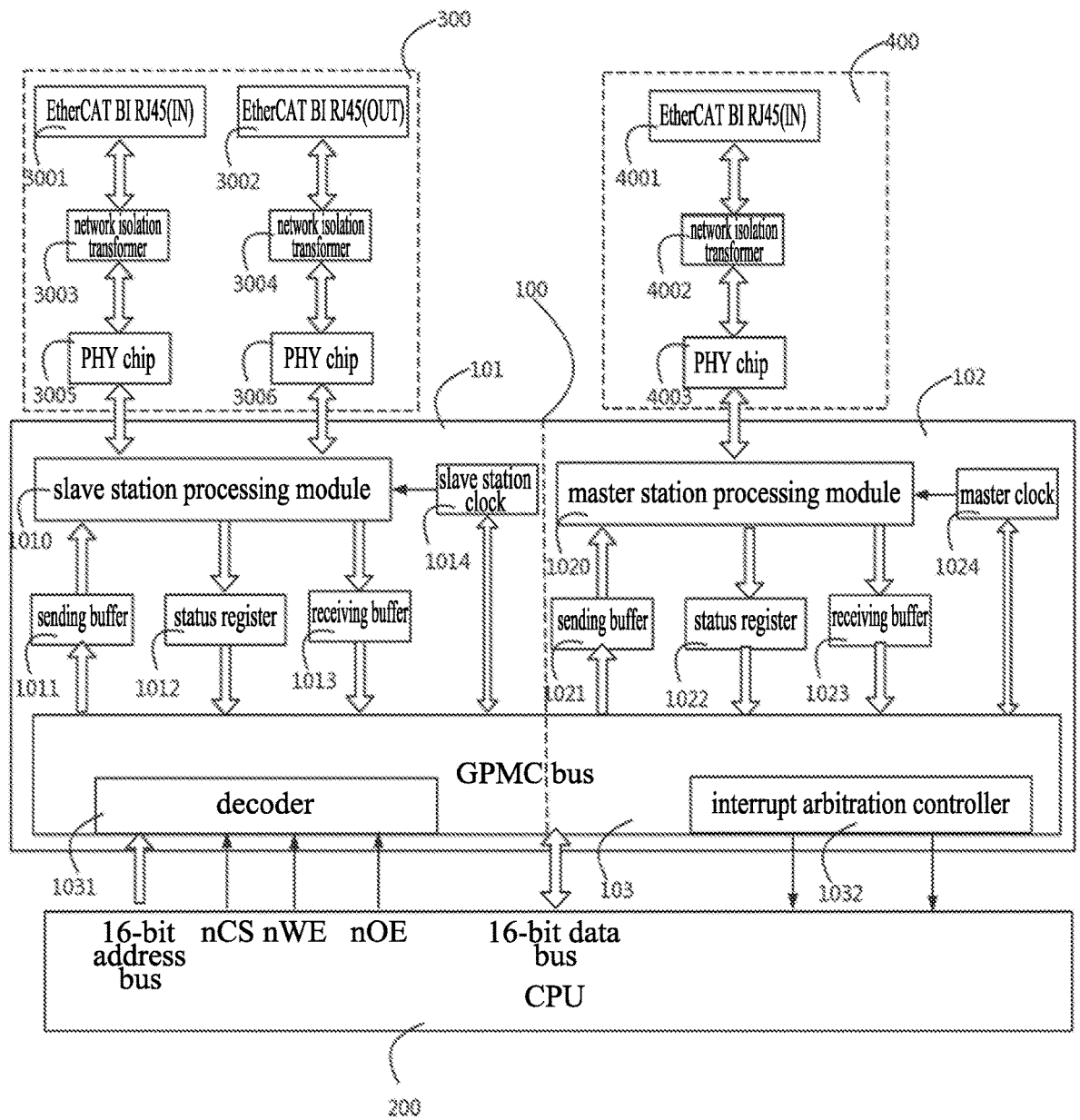
FIG. 3 is a schematic diagram showing connections between a bridge controller and external devices according to an embodiment of the present disclosure.

Corresponding to the aforementioned control method of the EtherCAT master-slave station integrated bridge controller, the present disclosure further provides an EtherCAT master-slave station integrated bridge controller 100, as shown in FIGS. 2 and 3. Specifically, FIG. 2 shows a structure of the bridge controller according to an embodiment of the present disclosure and FIG. 3 shows connections between the bridge controller and external devices according to an embodiment of the present disclosure. The bridge controller 100 is built in FPGA. The bridge controller includes a master station portion 102, a slave station portion 101 and a GPMC bus 103.

The master station portion is connected to an external CPU through the GPMC bus.

The slave station portion is connected to the external CPU through the GPMC bus.

The master station portion is connected to a third-party slave station device through a network driver chip 4003.

The slave station portion is connected to a third-party master station device through network driver chips 3005 and 3006.

Specifically, the network driver chips are PHY chips.

The parallel computing capability of FPGA ensures real-time sending and receiving of data frames by master and slave stations, reduces the dependence on the operating system and CPU performance.

The master station portion includes a master station processing module 1020, a master station clock 1024, a master station sending buffer 1021, a master station receiving buffer 1023, and a master station status register 1022.

Specifically, the master station processing module 1020, the external PHY chip 4003, a network isolation transformer 4002 and an EtherCAT bus interface 4001 form a master station input/output physical link of the integrated bridge controller 100, which serves as a master station device and forms a secondary EtherCAT network with one or more third-party EtherCAT slave station devices. The external CPU writes data (to be sent to a third-party slave station device) into the master station sending buffer 1021 through the GPMC bus. Each time a data packet is written, the sending buffer (FIFO) counter in the status register 1022 is increased by 1; if the sending buffer (FIFO) counter is greater than 10, it means the sending buffer (FIFO) is full and the CPU stops writing.

According to a PDO data (synchronous data packet) sending period set by the master station clock, the master station processing module reads a data packet of the master station sending buffer 1021 and sends it to a third-party slave station device via the sending physical link (4003, 4002, 4001). Each time the master station processing module reads a data packet, the sending buffer counter is decreased by 1. When the set PDO data sending period is triggered, if the sending buffer counter is 0, the master station processing module stops sending data and a sending error counter in the status register 1022 is increased by 1.

The master station processing module receives data from a third-party slave station device via the receiving physical link (4001, 4002, 4003) and stores the data into the master station receiving buffer (FIFO) 1023. Each time a data packet is written into the master station receiving buffer (FIFO), the receiving buffer counter in the status register is increased by 1.

The external CPU reads the value of the receiving buffer counter in the status register through the GPMC bus. If the value is greater than 1, it means that the master station processing module has received a complete data packet. The external CPU reads data packets in the master station receiving buffer through the GPMC bus. Each time a data packet is read, the receiving buffer counter is decreased by 1. When the receiving buffer counter is equal to 0, the CPU stops reading.

The master station status register 1022 includes a sending buffer counter, a receiving buffer counter, an error counter, and a connection status of the PHY chip 4003. Therein, the sending buffer counter records the number of data packets in the current sending buffer. Each time the CPU writes a data packet, the sending buffer counter is increased by 1. Each time the slave station processing module reads a data packet, the sending buffer counter is decreased by 1. The receiving buffer counter records the number of data packets in the current receiving buffer. Each time the CPU reads a data packet, the receiving buffer counter is decreased by 1. Each time the slave station processing module writes a data packet, the receiving buffer counter is increased by 1. The error counter records the number of errors in sending/receiving of data packets by the slave station processing module. The connection status of the PHY chip 4003 records the current network cable connection status. "1" means connection is established and "0" means there is no network connection.

The master station clock 1024 can be synchronous with a clock of a third-party slave station device. The external CPU can set the PDO data packet sending period of the master station processing module through the GPMC bus and writes it into a register of the master station clock 1024. When the arriving PDO data packet period comes, the master station clock 1024 triggers the master station processing module to send a PDO data packet.

The slave station portion includes a slave station processing module 1010, a slave station clock 1014, a slave station sending buffer 1011, a slave station receiving buffer 1013 and a slave station status register 1012.

Specifically, the slave station processing module 1010, the PHY (network driver) chip 3005, a network isolation transformer 3003 and an EtherCAT bus interface 3001 form a slave station input physical link of the integrated bridge controller 100 for receiving data frames from a third-party EtherCAT master station.

The slave station processing module 1010, the external PHY chip 3006, a network isolation transformer 3004 and an EtherCAT bus interface 3002 form a slave station output physical link of the integrated bridge controller 100 for forwarding data frames from the third-party EtherCAT master station to a next level slave station device.

The slave station processing module 1010 compresses a data packet of a data frame sent from the third-party EtherCAT master station that conforms to the address of the controller into the receiving buffer (FIFO). Each time a complete data packet is compressed into the receiving buffer (FIFO), the receiving buffer (FIFO) counter in the status register is increased by 1. Through the GPMC bus, the external CPU accesses the slave station receiving buffer (FIFO) status information and accesses the number of data packets in the current receiving buffer (FIFO). When the receiving buffer (FIFO) counter is greater than 1, the external CPU reads data packets through the GPMC bus. Each time a data packet is read, the receiving buffer counter is decreased by 1. The CPU does not stop reading until the value of the receiving buffer counter is 0.

The external CPU writes data (to be sent to a third-party master station) into the slave station sending buffer 1011 through the GPMC bus. Each time a data packet is written, the sending buffer (FIFO) counter in the status register is increased by 1. When the sending buffer (FIFO) counter is greater than 10, it means that the sending buffer (FIFO) is full and the CPU stops writing. The slave station processing module reads a data packet in the sending buffer 1011, inserts it into the master station data packet input through the receiving physical link (3001, 3003, 3005) and forwards the data packet to a next level slave station through the slave station sending physical link (3006, 3004, 3002).

The slave station clock 1014 is synchronous with the third-party master station and each EtherCAT slave station.

The slave station status register 1012 includes a sending buffer counter, a receiving buffer counter, an error counter, and connection statuses of the PHY chips 3005 and 3006. Therein, the sending buffer counter records the number of data packets of the current sending buffer. Each time the CPU writes a data packet, the sending buffer counter is increased by 1. Each time the slave station processing module reads a data packet, the sending buffer counter is decreased by 1. The receiving buffer counter records the number of data packets in the current receiving buffer. Each time the CPU reads a data packet, the receiving buffer counter is decreased by 1. Each time the slave station processing module writes a data packet, the receiving buffer counter is increased by 1. The error counter records the number of errors in sending/receiving of data packets by the slave station processing module. The connection statuses of the PHY chips 3005 and 3006 record the current network cable connection statuses. "1" means connection is established and "0" means there is no network connection.

The GPMC bus includes a decoder 1031, a 16-bit unidirectional address bus, a 16-bit bidirectional data bus, a GPMC bus control signal, and an interrupt arbitration controller 1032. The GPMC bus control signal includes a chip selection signal nCS, a write signal nWE and a read signal nOE that are low level effective.

Specifically, the external CPU performs reading and writing control of each unit module of a master-slave station hybrid industrial bridge controller through the GPMC bus. The interrupt arbitration controller 1032 enables or disables the master-slave station hybrid industrial bridge controller to send an interrupt signal to the CPU.

The decoder 1031 decodes a 16-bit address sent from the external CPU and controls the CPU to perform reading and writing control of the salve station sending buffer, the slave station receiving buffer, the slave station status register, the slave station clock, the master station sending buffer, the master station receiving buffer, the master station status register and the master station clock. The specific addresses are shown in Table 1.

TABLE 1 address decoding

| Function | address |
| --- | --- |
| Slave station sending buffer | 0x0000~0x0fff |
| Slave station receiving buffer | 0x1000~0x1fff |
| Slave station status register | 0x2000~0x2fff |
| Slave station clock | 0x3000~0x3fff |
| Master station sending buffer | 0x4000~0x4fff |
| Master station receiving buffer | 0x5000~0x5fff |
| Master station status register | 0x6000~0x6fff |
| Master station clock | 0x7000~0x7fff |

It should be noted that the above-described specific values such as those related to the counters and the addresses are for illustrative purposes and can be set and adjusted according to the practical circumstances.

In the present method, because of the parallel characteristic of FPGA, the FPGA-based bridge controller has a hard real-time characteristic and a parallel capability. As such, during control of an industrial bus, the present method ensures real-time sending and receiving of data and reduces the dependence on the CPU and operating system. Furthermore, the bridge controller can serve as a slave device relative to a third-party master station device and meanwhile serve as a master device relative to a third-party slave station device. That is, the bridge controller can communicate the third-party master station device and the third-party slave station device and serve as both a master station and a slave station. By connecting two or more bridge controllers in series, the connection topology interface between the third-party master station device and the third-party slave station device can be changed. The current single linear communication can use the bridge controllers as connection nodes to construct a network topology having a tree structure, thereby improving the flexibility of the network topology, reducing the network load, and improving the reliability and real-time performance of the network system.

Third Embodiment

Figure 4:
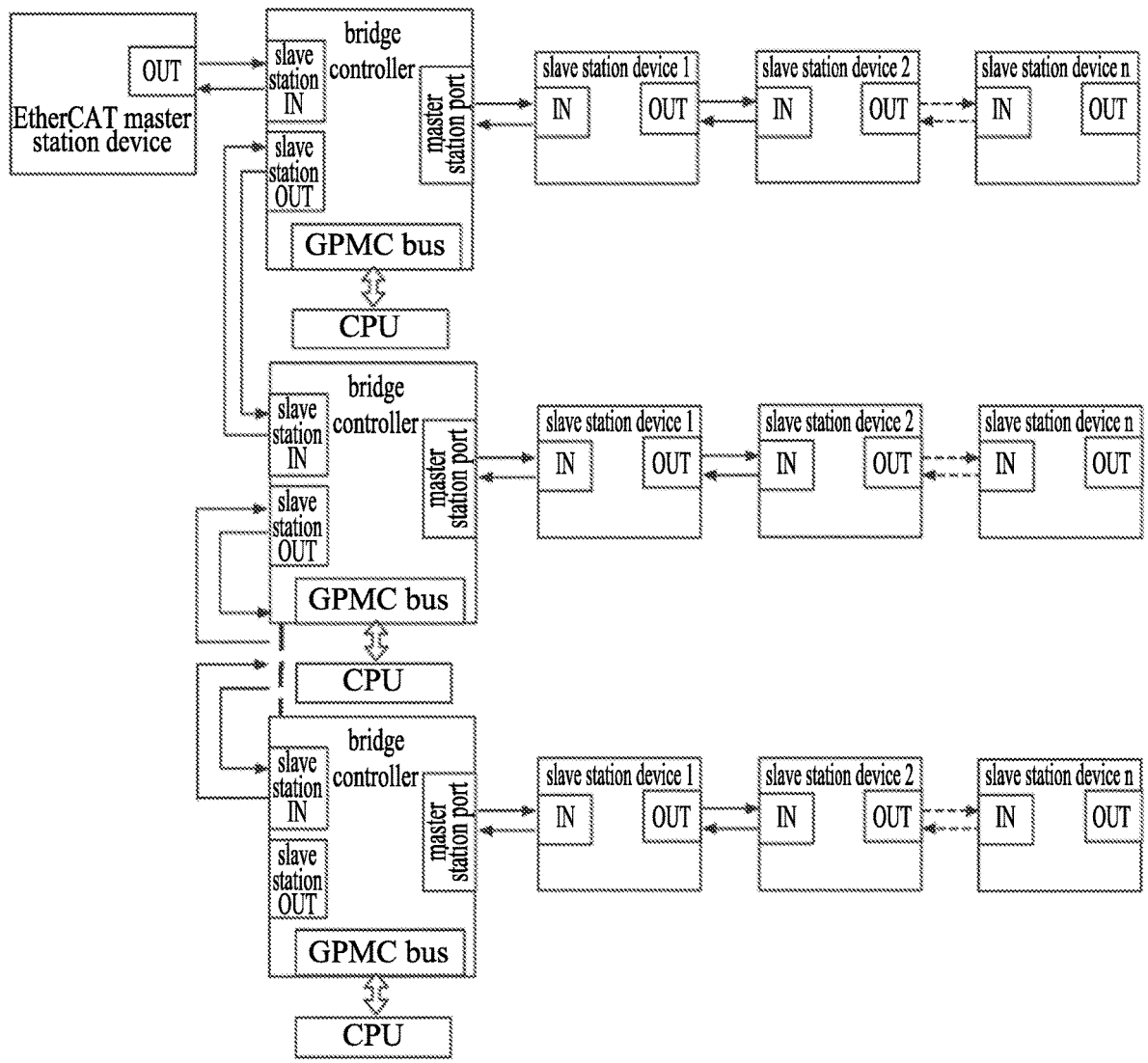
FIG. 4 is a schematic diagram showing a network topology of a control system based on a master-slave station integrated bridge controller according to an embodiment of the present disclosure.

Corresponding to the above-described method and device, the present disclosure further provides a control system based on a master-slave station integrated bridge controller. FIG. 4 shows a network topology of the control system based on a master-slave station integrated bridge controller according to an embodiment of the present disclosure. Referring to FIG. 4, the control system includes one or more bridge controllers of the second embodiment, a third-party master station device, one or more third-party slave station devices, and external CPUs for controlling the bridge controllers.

The third-party master station device is connected to the slave station portions of the bridge controllers, the third-party slave station devices are communicatively connected to the master station portions of the bridge controllers, and the external CPUs are communicatively connected to the master station portions or the slave station portions through the GPMC buses.

Specifically, a third-party EtherCAT master station device can be connected to a master-slave station hybrid system formed of one or more bridge controllers connected in series through an EtherCAT bus, and each bridge controller can be connected in series with one or more third-party EtherCAT slave station devices, thereby changing the network topology of the system.

In the present embodiment, a third-party EtherCAT master station device has a great flexibility in expanding the slave station devices, reduces the network load, improves the flexibility of the network topology, and improves the efficiency and stability of sending and receiving of data frames. Further, a bridge controller is connected in series with one or more third-party EtherCAT slave station devices. Because of the FPGA-based hard real-time control strategy, the processing pressure of CPU is greatly reduced. Furthermore, clock synchronization implemented in FPGA ensures real-time sending and receiving of data frames by the master station and reduces the dependence on the operating system and CPU performance.

Fourth Embodiment

Corresponding to the above-described method, the present disclosure further provides a readable storage medium. The readable storage medium described below can refer to the control method of the EtherCAT master-slave station integrated bridge controller described above.

The readable storage medium has a computer program stored thereon. The computer program, when being executed by a processor, implements the steps of the above-described control method of the EtherCAT master-slave station integrated bridge controller.

The readable storage medium can be a USB flash disk, a mobile hard disk, a ROM (Read-Only Memory), a RAM (Random Access Memory), a magnetic disk, an optical disk or other readable storage medium capable of storing program codes.

Those skilled in the art will recognize that the exemplary units and algorithm steps described in conjunction with the embodiments disclosed in the specification can be implemented by electronic hardware, computer software or a combination thereof. In order to clearly illustrate the interchangeability of hardware and software, the construction and steps of each embodiment have been generally described according to functions in the foregoing description. Whether these functions are achieved by hardware or software depends on specific applications and design constraints of the technical solution. Those skilled in the art can use different methods to implement the above-described functions for each specific application, but such implementation should not be considered as going beyond the scope of the present disclosure.

What is claimed is:

1. A control method for a field-programmable gate array (FPGA)-based Ethernet for Control Automation Technology (EtherCAT) master-slave station integrated bridge controller comprising a master station portion, a slave station portion and a general purpose memory controller (GPMC) bus, the control method comprising the steps of:
    accessing, by the master station portion, first data in an external central processing unit (CPU) through the GPMC bus and sending the first data to a third-party slave station device;
    receiving, by the master station portion, second data from the third-party slave station device and feeding the second data back to the external CPU;
    accessing, by the slave station portion, third data in the external CPU through the GPMC bus and sending the third data to a third-party master station device; and
    receiving, by the slave station portion, fourth data from the third-party master station device and feeding the fourth data back to the external CPU,
    wherein the GPMC bus comprises a decoder, a unidirectional address bus, a bidirectional data bus, a GPMC bus control signal, and an interrupt arbitration controller, and wherein the GPMC bus control signal comprises a chip selection signal, a write signal and a read signal that are low level effective.

2. The control method of claim 1, wherein the master station portion comprises a master station sending buffer and a master station clock, and the step of accessing the first data in the external CPU through the GPMC bus and sending the first data to the third-party slave station device comprises:
    accessing the first data, storing the first data into the master station sending buffer, and sending the first data to the third-party slave station device at a certain time according to the master station clock.

3. The control method of claim 1, wherein the master station portion comprises a master station receiving buffer, and the step of receiving the second data from the third-party slave station device and feeding the second data back to the external CPU comprises:
    receiving the second data, and storing the second data into the master station receiving buffer so as for the external CPU to access the second data.

4. The control method of claim 1, wherein the slave station portion comprises a slave station sending buffer and a slave station processing module, and the step of accessing the third data in the external CPU through the GPMC bus and sending the third data to the third-party master station device comprises:
    accessing the third data, storing the third data into the slave station sending buffer, and inserting the third data into a data packet by the slave station processing module to send the third data to the third-party master station device.

5. The control method of claim 1, wherein the slave station portion comprises a slave station receiving buffer, and the step of receiving the fourth data from the third-party master station device and feeding the fourth data back to the external CPU comprises:
    receiving the fourth data, and storing the fourth data into the slave station receiving buffer so as for the external CPU to access the fourth data.

6. An Ethernet for Control Automation Technology (EtherCAT) master-slave station integrated bridge controller built in a field-programmable gate array (FPGA), comprising a master station portion, a slave station portion and a general purpose memory controller (GPMC) bus, wherein:
    the master station portion is connected to an external central processing unit (CPU) through the GPMC bus;
    the slave station portion is connected to the external CPU through the GPMC bus;
    the master station portion is connected to a third-party slave station device through a first network driver chip; and
    the slave station portion is connected to a third-party master station device through a second network driver chip,
    wherein the GPMC bus comprises a decoder, a unidirectional address bus, a bidirectional data bus, a GPMC bus control signal, and an interrupt arbitration controller, and wherein the GPMC bus control signal comprises a chip selection signal, a write signal and a read signal that are low level effective.

7. The EtherCAT master-slave station integrated bridge controller of claim 6, wherein the master station portion comprises a master station processing module, a master station clock, a master station sending buffer, a master station receiving buffer, and a master station status register.

8. The EtherCAT master-slave station integrated bridge controller of claim 6, wherein the slave station portion comprises a slave station processing module, a slave station clock, a slave station sending buffer, a slave station receiving buffer, and a slave station status register.

9. A control system based on a master-slave station integrated bridge controller, comprising:
    at least one EtherCAT master-slave station integrated bridge controller, a third-party master station device, one or more third-party slave station devices, and an external CPU for controlling the EtherCAT master-slave station integrated bridge controller,
    wherein the third-party master station device is connected to a slave station portion of the EtherCAT master-slave station integrated bridge controller, the third-party slave station devices being communicatively connected to a master station portion of the EtherCAT master-slave station integrated bridge controller, and the external CPU being communicatively connected to the master station portion or the slave station portion through a GPMC bus, and
    wherein the GPMC bus comprises a decoder, a unidirectional address bus, a bidirectional data bus, a GPMC bus control signal, and an interrupt arbitration controller, wherein the GPMC bus control signal comprises a chip selection signal, a write signal and a read signal that are low level effective.

10. A non-transitory computer readable storage medium with a computer program stored thereon, wherein the computer program, when being executed by a processor, implements the steps of a control method for a field-programmable gate array (FPGA)-based Ethernet for Control Automation Technology (EtherCAT) master-slave station integrated bridge controller comprising a master station portion, a slave station portion and a general purpose memory controller (GPMC) bus, the control method comprising the steps of:

accessing, by the master station portion, first data in an external central processing unit (CPU) through the GPMC bus and sending the first data to a third-party slave station device;

receiving, by the master station portion, second data from the third-party slave station device and feeding the second data back to the external CPU;

accessing, by the slave station portion, third data in the external CPU through the GPMC bus and sending the third data to a third-party master station device; and receiving, by the slave station portion, fourth data from the third-party master station device and feeding the fourth data back to the external CPU, wherein the GPMC bus comprises a decoder, a unidirectional address bus, a bidirectional data bus, a GPMC bus control signal, and an interrupt arbitration controller, wherein the GPMC bus control signal comprises a chip selection signal, a write signal and a read signal that are low level effective.

\* \* \* \* \*